United States Patent
Hustyi (10) Patent No.: US 8,326,501 B2
(45) Date of Patent: Dec. 4, 2012

(54) METHOD AND APPARATUS FOR SHIFT-BY-WIRE IN A MOTOR VEHICLE

(75) Inventor: Dan Hustyi, Waterford, MI (US)

(73) Assignee: Nissan North America, Inc., Franklin, TN (US)

( * ) Notice: Subject to any disclaimer, the term of this patent is extended or adjusted under 35 U.S.C. 154(b) by 758 days.

(21) Appl. No.: 12/394,718

(22) Filed: Feb. 27, 2009

(65) Prior Publication Data

US 2010/0222972 A1    Sep. 2, 2010

(51) Int. Cl.
 *G06F 3/041* (2006.01)
(52) U.S. Cl. ............................ 701/53; 701/36
(58) Field of Classification Search ............... 701/1, 36, 701/51, 53; 74/473.12, 473.33, 473.3
 See application file for complete search history.

(56) References Cited

U.S. PATENT DOCUMENTS

| | | | |
|---|---|---|---|
| 3,766,793 A | 10/1973 | Knop | |
| 4,980,668 A * | 12/1990 | Leigh-Monstevens | 340/456 |
| 5,014,038 A * | 5/1991 | Leigh-Monstevens et al. | 340/430 |
| 5,161,422 A | 11/1992 | Suman et al. | |
| 6,173,622 B1 * | 1/2001 | Carnevale et al. | 74/335 |
| 6,564,661 B2 * | 5/2003 | DeJonge | 74/335 |
| 6,848,332 B2 | 2/2005 | Hayashi et al. | |
| 7,424,361 B2 * | 9/2008 | Masuda et al. | 701/101 |
| 7,568,404 B2 * | 8/2009 | Grossman et al. | 74/473.23 |
| 7,571,662 B2 * | 8/2009 | Pickering et al. | 74/473.3 |
| 7,869,925 B2 * | 1/2011 | Pickering et al. | 701/51 |
| 7,911,321 B2 * | 3/2011 | Bingle et al. | 340/5.54 |

* cited by examiner

*Primary Examiner* — Richard M. Camby
(74) *Attorney, Agent, or Firm* — Young, Basile, Hanlon & MacFarlane, P.C.

(57) ABSTRACT

A vehicle includes a motor responsive to a first electronic control signal to transition between an active state and an inactive state and a transmission responsive to a second electronic control signal to transition between at least a reverse state, a neutral state and a drive state. A user-actuated control is mounted to an interior surface in the passenger compartment of the vehicle. The control has at least one contact surface that contacts the user when the user operates the control, wherein the contact surface is integrated with a logo. A circuit is coupled to the control to generate at least one of the first electronic control signal and the second electronic control signal in response to user actuation of the control.

22 Claims, 5 Drawing Sheets

METHOD AND APPARATUS FOR SHIFT-BY-WIRE IN A MOTOR VEHICLE

FIELD OF THE INVENTION

The invention relates to the field of operator interfaces for motor vehicles, and more particularly, to a method and apparatus for shift by wire control of the engine and the transmission of a motor vehicle.

BACKGROUND OF THE INVENTION

The operator interfaces in most motor vehicles are standardized and familiar. Typically, operator interfaces in motor vehicles include a steering wheel, a plurality of pedals for controlling the throttle, brakes, and, optionally, a clutch, as well as a shift lever for controlling either of a standard transmission or an automatic transmission. The design of each of these operator interfaces is nearly as old as the automobile itself. Accordingly, a major factor that influenced the design of these components was the mechanical linkages that were used to connect each control to the system of the vehicle being operated by the control. For example, conventional steering wheels are connected to a rotating shaft that drives pivotal motion of the wheels of the vehicle through a rack and pinion mechanism. Each of the pedals is connected to a respective system either by mechanical cables and linkages or by hydraulic systems that are responsive to motion of the pedal. Likewise, shift levers are typically connected to the transmission of the vehicle by a mechanical linkage or one or more cables. However, as vehicle design has evolved, many of these mechanical connections between the controls of the vehicle and the underlying systems have been replaced by sensors and electrical connections. However, the standard, familiar operator interfaces of the vehicle have remained unchanged such that their designs are now dictated by tradition and familiarity, rather than by function.

SUMMARY

Methods and apparatuses for shift-by-wire control of a motor vehicle are taught herein. One vehicle taught herein includes a motor responsive to a first electronic control signal to transition between an active state and an inactive state and a transmission responsive to a second electronic control signal to transition between at least a reverse state, a neutral state and a drive state. A user-actuated control is mounted to an interior surface in the passenger compartment of the vehicle. The control has at least one contact surface that contacts the user when the user operates the control, wherein the contact surface is integrated with a logo. A circuit is coupled to the control to generate at least one of the first electronic control signal and the second electronic control signal in response to user actuation of the control.

The contact surface could be at least one of integral with the logo, juxtaposed with the logo, superimposed with the logo, and surrounded by the logo.

The logo could be a three-dimensional icon sized and configured to define at least part of the contact surface and permit manipulation of the logo by a user's fingers.

The logo could be movably mounted to the control and the control could generate at least one of the first electronic control signal and second electronic control signal in response to the movement of the logo by the user.

The vehicle could include an illumination source having at least one illumination parameter; wherein the illumination source changes the value of the illumination parameter when the user actuates the control. The illumination parameter includes at least one of: on/off, color of illumination, and intensity of illumination. Furthermore, the illumination source could be configured to backlight the logo.

The contact surface could be defined at least in part by a button, wherein the control generates at least one of the first electronic control signal and second electronic control signal when the user presses the button. The control could generate the second electronic control signal when the user presses the button and wherein the transmission is responsive to the second electronic control signal to transition to a park state. As an alternative, the control generates the first electronic control signal when the user presses the button. As another alternative, the control could generate the first electronic control signal when the user presses the button for a predetermined time period.

In one embodiment, the button comprises at least one display having a plurality of display states and a touch-sensitive surface visually associated with the at least one display and the logo, wherein the control changes the display state when the user touches the touch-sensitive surface. The display could be integral with the touch-sensitive surface.

In another embodiment, the contact surface includes a first portion and a second portion, wherein the control generates the first electronic control signal when the user touches the first portion and generates the second electronic control signal when the user touches the second portion.

The contact surface could be defined at least in part by a rotatable portion movable between at least a first position and a second position. Furthermore, the control could generate the second electronic control signal in response to movement of the rotatable portion.

In one embodiment, the control further comprises a first display having at least two first display states and a second display having at least two second display states, and wherein the contact surface comprises a first touch-sensitive surface portion visually associated with the first display second touch-sensitive surface portion visually associated with the second display, wherein the control changes the first display state condition when a user touches the first touch-sensitive surface portion, and the control changes the second display state when the user touches the second touch sensitive surface portion. The first display could be a light source in close proximity to the first touch-sensitive surface portion, a light source incorporated into the first touch-sensitive surface portion, a light source backlighting the first touch-sensitive surface portion, and a first icon displayed on a screen that also defines the first touch-sensitive portion. The contact surface could further comprise a third touch-sensitive surface portion positioned between and immediately adjacent to the first touch-sensitive surface portion and the second touch-sensitive surface portion, wherein the control is responsive to the first, second and third touch-sensitive surface portions to generate the second electronic control signal when the user drags a finger from the first touch sensitive surface portion over the third touch-sensitive surface portion to the second touch sensitive surface portion. Furthermore, the transmission could be responsive to the second electronic control signal to transition from a drive state to a reverse state.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
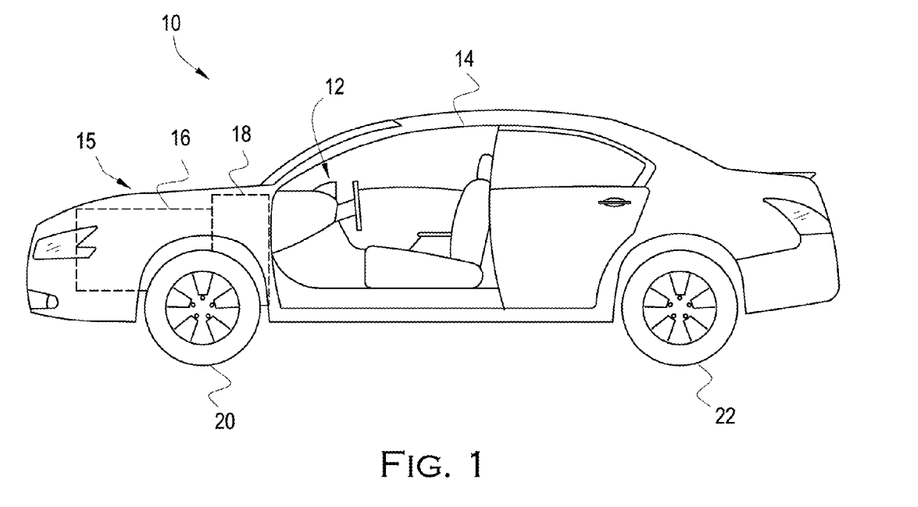
FIG. 1 is a vehicle having a user-actuated control system in accordance with an embodiment of the invention.

FIG. 1 shows a motor vehicle 10. An operator interface 12 is located within a passenger compartment 14 of the vehicle for controlling a drive train 15 of the motor vehicle 10. The drive train 15 of the motor vehicle 10 typically includes a motor 16 and an automatic transmission 18. However, the drive train 15 may be any system operable to induce motion of the vehicle 10.

The automatic transmission 18 is mechanically coupled to the motor 16 and is further mechanically coupled to the drive wheels of the vehicle, which may be the front wheels 20 of the vehicle 10, the rear wheels 22 of the vehicle 10, or both the front wheels 20 and the rear wheels 22. As used herein, the motor 16 refers broadly to the prime mover of the vehicle 10, and may be an internal combustion engine, an electric motor, or a hybrid system combining one or more internal combustion engines with one or more electric motors in any manner now known or hereafter developed. As used herein, the automatic transmission 18 is broadly defined and includes conventional hydraulic automatic transmissions, manually-controlled automatic transmissions, continuously-variable transmissions, computer-controlled manual transmissions, or any other type of transmission operable to adjust the gear ratio of the transmission during operation of the vehicle 10 without driver intervention, whether now known or hereafter developed.

Figure 2:
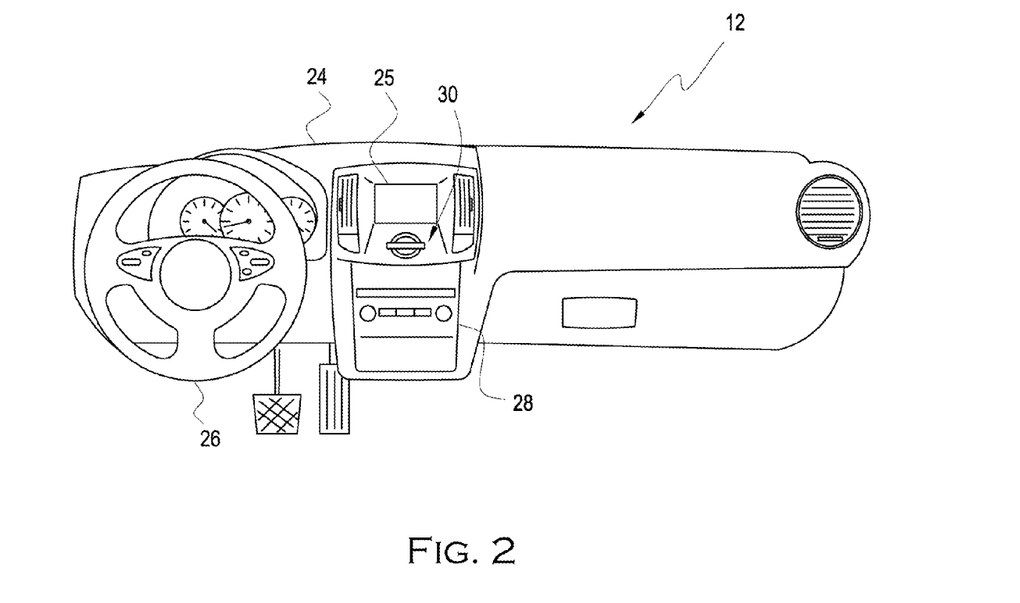
FIG. 2 is a perspective view of a dashboard in the vehicle of FIG. 1.

As shown in FIG. 2, the operator interface 12 is typically provided on an interior surface such as a dashboard 24 of the vehicle 10, or any other interior surface of the vehicle 10, such as a console or steering wheel of the vehicle 10. The operator interface may include a display screen 25, such as a touch-sensitive LCD display screen. Conventional control systems, such as a steering wheel 26 and climate or entertainment system controls 28 may be provided on the operator interface 12.

Figure 3:
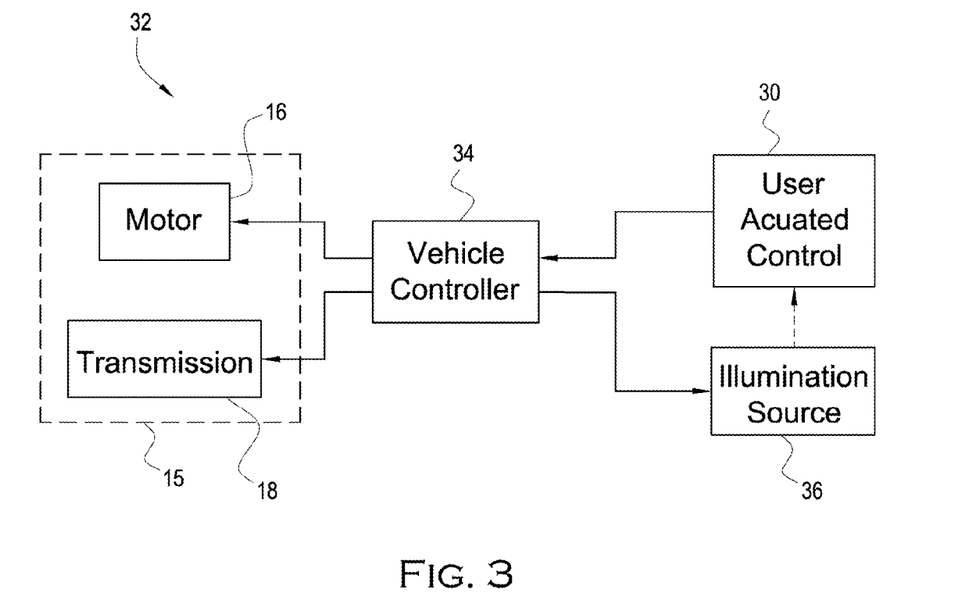
FIG. 3 is a block diagram of the user-actuated control system of the vehicle of FIG. 1.

In order to allow the driver of the vehicle 10 to control the mode of operation of the automatic transmission 18 of the vehicle 10, the operator interface 12 of the vehicle 10 includes a user-actuated control 30 that is disposed on the dashboard 24 of the vehicle 10. As shown in FIG. 3, the user-actuated control 30, the motor 16 and the transmission 18 are components of a user-actuated control system 32. The user actuated control system 32 also includes a circuit, such as a vehicle controller 34 and associated electrical connections that are coupled to the user-actuated control 30 to generate electronic control signals in response to user manipulation of the user-actuated control 30.

The user actuated control 30 may be provided in a variety of forms, as will be better understood in connection with the embodiments discussed herein. For example, the user actuated control may be a three dimensional physical structure that is movably connected to the dashboard 24 and provided with electromechanical switches to detect user manipulations, or a three dimensional physical structure that is molded integrally with the dashboard 24 and provided with electromechanical switches or touch sensitive areas to detect user manipulations, as will be described herein. Furthermore, the user actuated control 30 could be a two dimensional indicia that is printed on the dashboard 24, provided as a decal on the dashboard 24, projected or otherwise displayed on the dashboard 24, in combination with touch sensitive areas to detect user manipulations. Finally, the user actuated control 30 may be displayed as an image on the display screen 25, wherein the display screen 25 is touch sensitive to detect manipulation of the user actuated control 30. Furthermore, while some of the embodiments herein are described in connection with a particular manner of construction of the user actuated control 30, it should be understood that the features of the embodiments could be combined with one another and applied to other manners of construction of the user actuated control 30.

The vehicle controller 34 may be implemented by a microcomputer, including a random access memory, a read-only memory, and a central processing unit, in addition to various input and output connections. Generally, the control functions described herein are performed by execution of the CPU of one or more software programs stored in ROM. Of course, some or all of the parts and their associated functions can be implemented by hardware components.

The user actuated control system 32 may also include an illumination source 36, such as an incandescent lamp, LED, or the display screen 25, that is operable to selectively illuminate all or part of the user-actuated control 30, for example, by backlighting all or part of the user-actuated control 30. Alternatively, the illumination source 36 may be incorporated into the user-actuated control 30 or in close proximity to the user-actuated control 30.

The components of the user-actuated control system 32 are electrically connected to one another for transmission of electrical control signals, either analog or digital, directly between the components or by way of an in-vehicle communications network. Furthermore, it should be understood that modifications could be made to the user-actuated control system 32. For example, the motor 16 could be omitted from the user-actuated control system 32, such that the user-actuated control 30 and the vehicle controller 34 only exercise control over the transmission 18.

The vehicle controller 34 is operable to send control signals to the motor 16 and the transmission 18 in response to operation of the user-actuated control 30 by the user. In particular, the motor 16 is responsive to a first electronic control signal from the vehicle controller 34 that causes the motor 16 to transition between an active state and an inactive state.

In the active state, the motor 16 is either operating (i.e., providing a rotational force to the transmission 18) or ready to operate in response to an acceleration control signal or a change in the state of the automatic transmission 18. For example, where the motor 16 is an electric motor, the motor 16 may be ready to operate even though the motor 16 is not providing a rotational force to the transmission 18, given the ease with which an electric motor may transition from a state where it is not providing a rotational force to a state where it is providing a rotational force. Thus, when the motor 16 is ready to operate, the motor 16 is operable to immediately begin rotation in response to input from the user. In the inactive state, the motor 16 is not operable to respond to acceleration signals without first receiving an independent input from the user that places the motor 16 into the active state.

The transmission 18 is responsive to a second electronic control signal that is provided by the vehicle controller 34 to transition between at least a reverse state, a neutral state, and a drive state, as are well known in the art. Other states may be provided for the transmission, such as a park state or a sport state.

Figure 4:
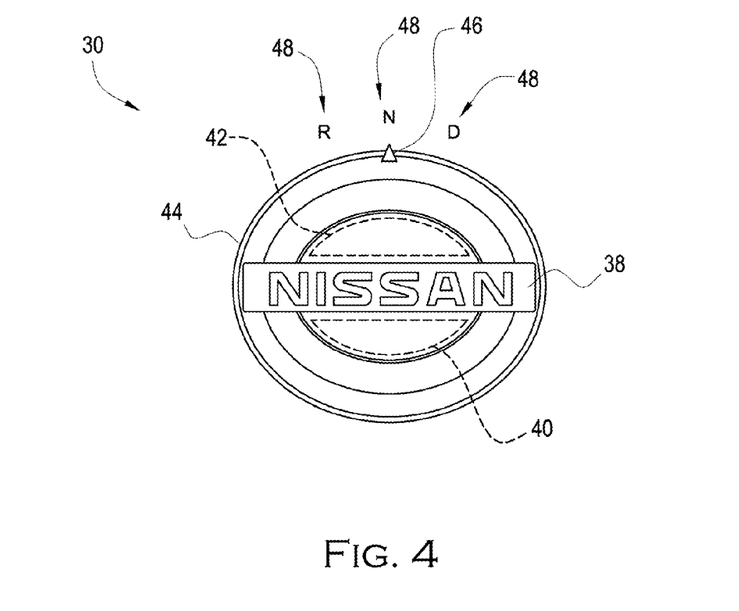
FIG. 4 is a user-actuated control in accordance with a first embodiment of the invention.

As shown in FIG. 4, the user-actuated control 30 includes a logo 38 and a plurality of contact surfaces 40, 42, 44 that are integrated with the logo 38. The logo 38 may be a three-dimensional object or icon. The contact surfaces 40, 42, 44 are surfaces that are manipulated by the user to control the systems of the vehicle 10, such as the motor 16 and the transmission 18. In order to allow user manipulation, the contact surfaces 40, 42, 44 may incorporate, or be associated with, electromechanical switches, membrane switches, touch sensors including capacitative touch sensors and resistive touch sensors, surface acoustic wave touch sensors and guided wave touch sensors, or any other element operable to detect user manipulation, whether now known or hereafter developed. As used herein, the term contact surface may refer to a single contiguous surface or multiple, non-contiguous surfaces that are equivalent in function.

The contact surfaces 40, 42, 44 can be integrated with the logo 38 in various manners. By way of example, the contact surfaces 40, 42, 44 could be integral with the logo, such that a portion of the logo 38 itself defines one of the contact surfaces 40, 42, 44. As another example, the contact surfaces 40, 42, 44 could be juxtaposed with the logo 38, such that the contact surfaces 40, 42, 44 are adjacent to or partially overlapping the logo 38. As further examples, one or more of the contact surfaces 40, 42, 44, could surround the logo 38, or the contact surfaces 40, 42, 44 could be defined in openings in the logo 38, such that the logo 38 surrounds one or more of the contact surfaces 40, 42, 44. In particular, a first contact surface 40 and a second contact surface 42 are surrounded by the logo 38, as each is disposed in a respective opening in the logo 38, while a third contact surface 44 is juxtaposed with the logo 38 such that it substantially surrounds the logo 38.

User manipulation of the contact surfaces 40, 42, 44 causes the vehicle controller 34 to generate at least one of the first electronic control signal, which changes the state of operation of the motor 16, and the second electronic control signal, which changes the operation state of the transmission 18. The first contact surface 40 is disposed below a horizontal center line of the logo 39, and user manipulation of the first contact surface 40 causes the vehicle controller 34 to send the second electronic control signal to the transmission 18 to place the transmission 18 in a park state. The second contact surface 42 is surrounded by the logo 38 and disposed above the horizontal center line of the logo 38. User manipulation of the second contact surface 42 causes the vehicle controller 34 to send the first electronic control signal to the motor 16 to transition the motor 16 between start and stop operating conditions. When the motor 16 is in the start operating condition, the illumination source 36 (FIG. 3) is configured to change an illumination parameter of the second contact surface 42, or alternatively, of the entire user actuated control 30. The illumination parameter of the illumination source 36 can be a change in state between on and off, the color of illumination, or the intensity of illumination.

The third contact surface 44 is a rotatable bezel that is juxtaposed with the logo 38 such that it substantially surrounds the logo 38. User manipulation of the third contact surface 44 is operable to rotate the third contact surface 44 such that a selection indicator marking 46 moves between position indicators 48 corresponding to reverse, neutral, and drive operating states of the transmission 18, which states are transmitted to the transmission 18 by the vehicle controller 34 in the form of the second electronic operating signal.

Figure 5:
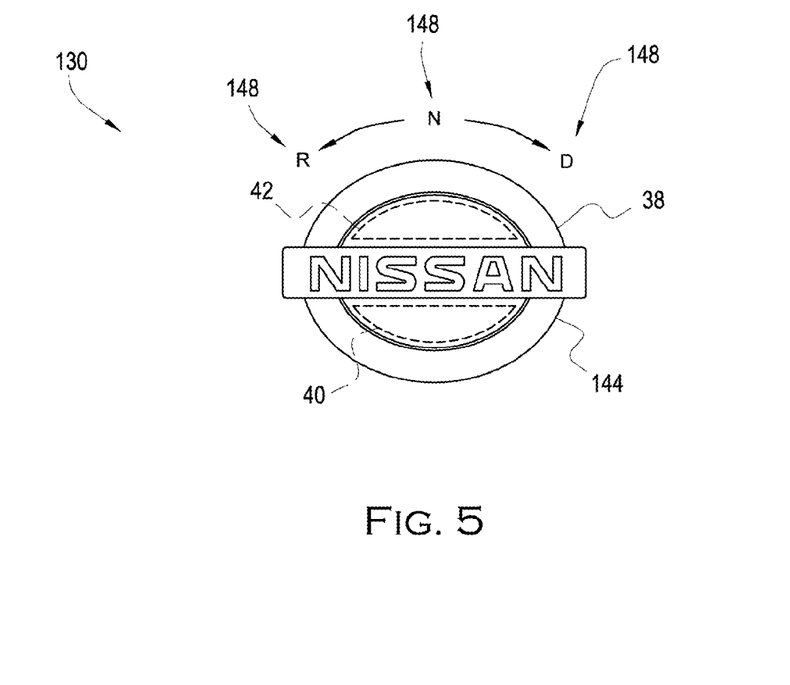
FIG. 5 is a user-actuated control in accordance with a second embodiment of the invention.

FIG. 5 shows a user actuated control 130 according to a second embodiment. The user actuated control 130 incorporates the first and second contact surfaces 40, 42 of the user actuated control 30. However, in order to transition the transmission 18 of the vehicle 10 between the reverse, neutral, and drive operating states of the transmission 18, the entire logo 38 comprises a rotatable contact surface 144. In particular, an unrotated position of the contact surface 144 selects the neutral operating state of the transmission 18. When rotated counterclockwise, the contact surface 144 selects the reverse operating state of the transmission 18. When rotated clockwise, the contact surface 144 selects the drive operating state of the transmission 18. Position indicators 148 corresponding to the reverse, neutral, and drive operating states of the transmission 18 can be illuminated by the illumination source 36 when selected.

Figure 6:
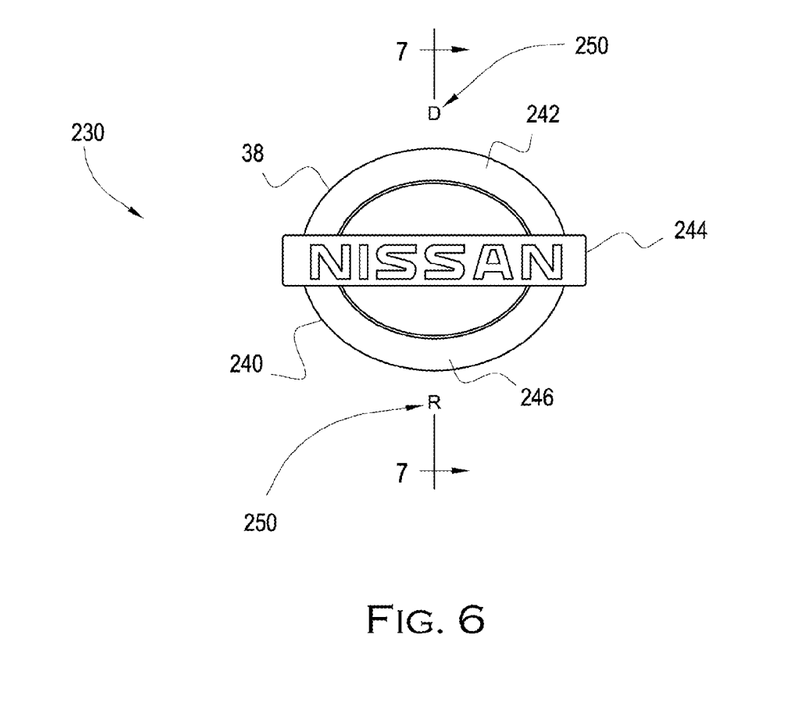
FIG. 6 is a user-actuated control in accordance with a third embodiment of the invention.
Figure 7:
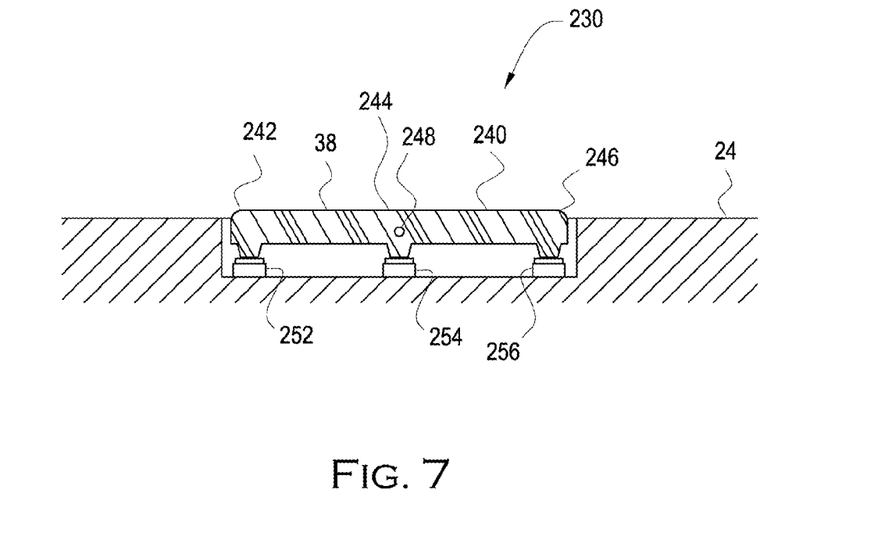
FIG. 7 is a sectional view of the control of FIG. 6 showing three switches selectively actuated when the user depresses the logo.

FIGS. 6-7 show a user-actuated control 230 according to a third embodiment, wherein the entire logo 38 comprises a contact surface 240 operable to allow user selection of any of the reverse, neutral, and drive operating states of the transmission 18. In particular, if the user depresses an upper portion 242 of the logo 38, the drive operating state of the transmission 18 is selected, if the user depresses a central portion 244 of the logo 38, the park operating state of the transmission 18 is selected, and if the user depresses a lower portion 246 of the logo 38, the reverse operating state of the transmission 18 is selected. This can be accomplished by mounting the logo 38 with respect to the dashboard 24 of the vehicle 10 on a mounting member 248 that is configured to allow the logo 38 to be pivoted or depressed straight down, as well as by placing switches 252, 254, 256 under the logo 38 that correspond to each of the upper, central and lower portions 242, 244, 246 of the contact surface 240. The input from the switches 252, 254, 256 may be interpreted by the vehicle controller 34 as toggles, such that the states selected by each of the switches 252, 254, 256 persists until overridden by operation of another one of the switches 252, 254, 256. Position indicators 250 corresponding to the reverse and drive operating states of the transmission 18 can be illuminated by the illumination source 36 when selected.

Figure 8:
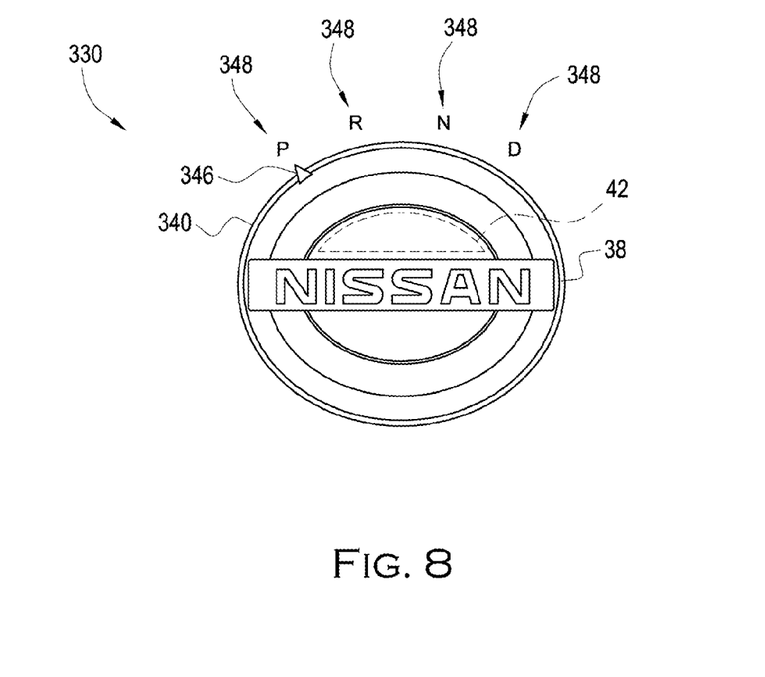
FIG. 8 is a user-actuated control in accordance with a fourth embodiment of the invention.

FIG. 8 is a user-actuated control 330 according to a fourth embodiment of the invention. The user actuated control 330 is similar in construction to the user actuated control 30. However, the user actuated control 330 omits the first contact surface 40. Instead, the user actuated control 330 includes a contact surface 340. The contact surface 340 is a rotatable bezel similar to the third contact surface 44 of the user actuated control 30. User manipulation of the contact surface 340 is operable to rotate the contact surface 340 such that a selection indicator marking 346 that is disposed on the contact surface 340 moves between position indicators 348 provided adjacent to the third contact surface 44 corresponding to park, reverse, neutral, and drive operating states of the transmission 18, which states are transmitted to the transmission 18 by the vehicle controller 34 in the form of the second electronic operating signal.

Figure 9:
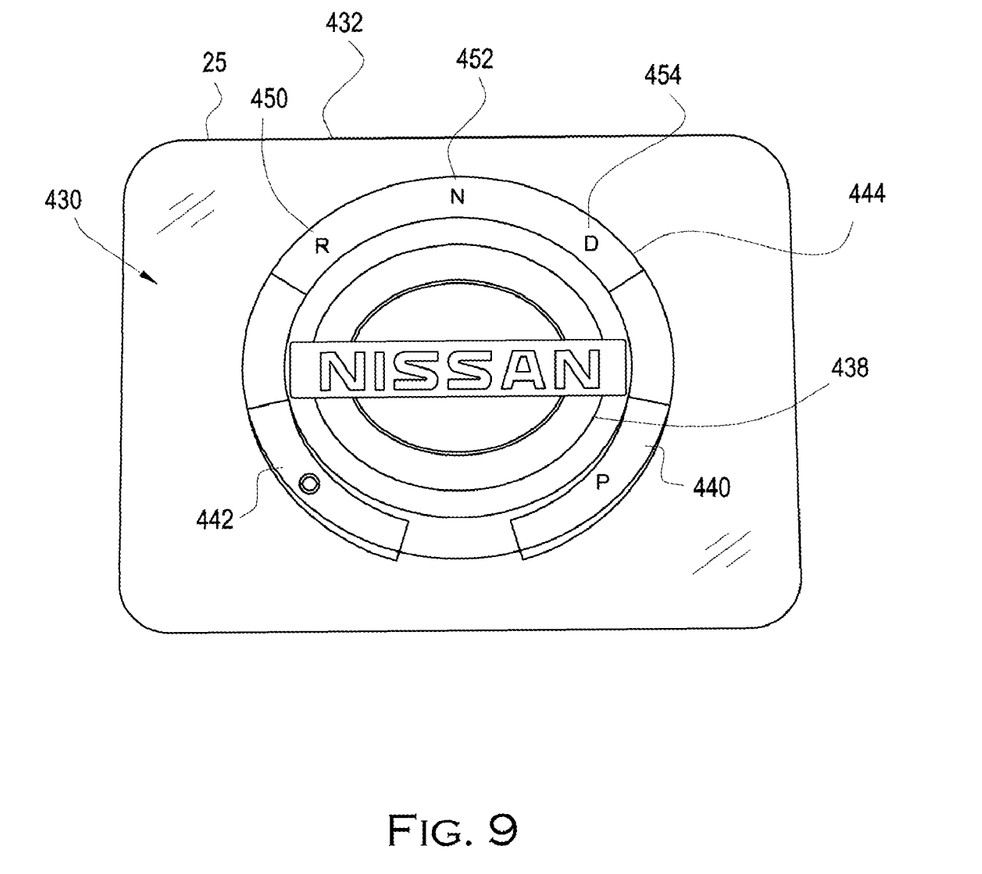
FIG. 9 is a user-actuated control in accordance with a fifth embodiment of the invention.

FIG. 9 is a user-actuated control 430 according to a fifth embodiment of the invention. The user actuated control 430 is provided in the form of a control image 432 that is displayed on the display screen 25 of the vehicle 10. A first contact surface 440, a second contact surface 442 and a third contact surface 444 are defined on the user actuated control 430 by corresponding portions of the control image 432. Individually, the contact surfaces 440, 442, 444 are juxtaposed with a logo image 438 that is itself a portion of the control image 432. Together, the contact surfaces 440, 442, 444 substantially surround the logo image 438. In particular, the display screen 25 can be a touch sensitive display screen or similar technology now known or hereafter invented, such that the user touches portions of the display screen 25 corresponding to the contact surfaces 440, 442, 444 in order to utilize the contact surfaces to change the operating state of the motor 16 or the transmission 18 of the vehicle 10.

The first contact surface 440 is disposed adjacent to the logo image 438. User manipulation of the first contact surface 440, for example, by touching the portion of the display screen 25 that corresponds to the first contact surface 440, causes the vehicle controller 34 to send the second electronic control signal to the transmission 18 to place the transmission 18 in a park state. Doing so can change the state of the display screen 25, from a state in which the portion of the control image 432 corresponding to the first contact surface 340 has a first coloration to a state in which the portion of the control image 432 corresponding to the first contact surface 440 has a second coloration.

The second contact surface 442 is also disposed adjacent to the logo image 438 and is also circumferentially adjacent to the first contact surface 440. User manipulation of the second contact surface 442, for example, by touching and holding the portion of the display screen 25 that corresponds to the second contact surface 442, causes the vehicle controller 34 to send the first electronic control signal to the motor 16 to start or stop the motor 16. Doing so can change the state of the display screen 25, from a state in which the portion of the control image 432 corresponding to the second contact surface 442 has a first coloration to a state in which the portion of the control image 432 corresponding to the second contact surface 442 has a second coloration. Additionally, changing the state of the engine could also change the state of the display screen 25 by changing the brightness or coloration of the logo image 438.

The third contact surface 444 is also disposed adjacent to the logo image 438. The third contact surface 444 includes a left touch-sensitive portion 450, a central touch-sensitive portion 452 and a right touch-sensitive portion 454 that are circumferentially spaced along the third contact surface 444. The left touch-sensitive portion 450, the central touch-sensitive portion 452 and the right touch-sensitive portion 454 of the third contact surface 444 correspond to reverse, neutral, and drive operating states of the transmission 18, respectively.

The operating states of the transmission may be selected when the user touches the portion 450, 452, 454 of the third contact surface corresponding to the desired operating state of the transmission 18. Alternatively, the third contact surface 444 could allow the user to change the state of the transmission 18 by initially touching the portion 450, 452, 454 of the third contact surface 444 corresponding to the current state of the transmission 18 and then dragging their finger to the portion 450, 452, 454 of the third contact surface 444 corresponding to the desired state of the transmission 18. For example, to shift the transmission from the reverse operating state to the drive operating state, the user would touch the left touch-sensitive portion 450 and continue engaging their finger with the display screen 25 while dragging their finger past the central touch-sensitive portion 452 and finally to the right touch-sensitive portion 454. In doing so, the state of the display could change, for example, by highlighting or changing the color of a letter, such as "P", "N" or "R" corresponding to the current operating state of the transmission 18, or by moving an icon, such as a box or arrow (not shown) that indicates the current operating state of the transmission 18.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
a motor responsive to a first electronic control signal to transition between an active state and an inactive state;
a transmission responsive to a second electronic control signal to transition between at least a reverse state, a neutral state and a drive state;
a passenger compartment having an interior surface;
a user-actuated control mounted to the interior surface, the control having a first contact surface, a second contact surface, and a third contact surface, wherein the first contact surface, the second contact surface, and the third contact surface are integrated with a logo such that a shape of at least one of the first contact surface, the second contact surface or the third contact surface corresponds to a shape of the logo, the first contact surface is surrounded by the logo, the second contact surface is surrounded by the logo, and the third contact surface includes a peripheral edge of the logo; and
a circuit coupled to the control to generate at least one of the first electronic control signal and the second electronic control signal in response to user actuation of the control.

2. The vehicle of claim 1, wherein the third contact surface is integral with the logo.

3. A vehicle, comprising:
a motor responsive to a first electronic control signal to transition between an active state and an inactive state;
a transmission responsive to a second electronic control signal to transition between at least a reverse state, a neutral state and a drive state;
a passenger compartment having an interior surface;
a user-actuated control mounted to the interior surface, the control having a first contact surface, a second contact surface, and a third contact surface, wherein the first contact surface, the second contact surface, and the third contact surface are integrated with a logo, such that the first contact surface is surrounded by the logo, the second contact surface is surrounded by the logo, and the third contact surface includes a peripheral edge of the logo; and
a circuit coupled to the control to generate at least one of the first electronic control signal and the second electronic control signal in response to user actuation of the control.

4. The vehicle of claim 3, wherein the third contact surface is a rotatable bezel that surrounds the logo and rotation of the third contact surface generates at least one of the first electronic control signal or the second electronic control signal.

5. A vehicle, comprising:
a motor responsive to a first electronic control signal to transition between an active state and an inactive state;
a transmission responsive to a second electronic control signal to transition between at least a reverse state, a neutral state and a drive state;

a passenger compartment having an interior surface;

a user-actuated control mounted to the interior surface, the control having a first contact surface, a second contact surface, and a third contact surface, wherein the first contact surface, the second contact surface, and the third contact surface are integrated with a logo, such that the first contact surface is surrounded by the logo, the second contact surface is surrounded by the logo, and the third contact surface includes a peripheral edge of the logo;

a circuit coupled to the control to generate at least one of the first electronic control signal and the second electronic control signal in response to user actuation of the control; and an illumination source having at least one illumination parameter, wherein the illumination source changes a value of the illumination parameter when the user actuates the control.

6. The vehicle of claim 5, wherein the illumination parameter includes at least one of: on/off, color of illumination, or intensity of illumination.

7. The vehicle of claim 5, wherein the illumination source is configured to backlight the logo.

8. A vehicle, comprising:

a motor responsive to a first electronic control signal to transition between an active state and an inactive state;

a transmission responsive to a second electronic control signal to transition between at least a reverse state, a neutral state and a drive state;

a passenger compartment having an interior surface;

a user-actuated control mounted to the interior surface, the control having a first contact surface, a second contact surface, and a third contact surface, wherein the first contact surface, the second contact surface, and the third contact surface are integrated with a logo, such that the first contact surface is surrounded by the logo, the second contact surface is surrounded by the logo, and the third contact surface includes a peripheral edge of the logo; and a circuit coupled to the control to generate at least one of the first electronic control signal and the second electronic control signal in response to user actuation of the control, wherein at least one of the first contact surface, the second contact surface, or the third contact surface is defined at least in part by a button, wherein the control generates at least one of the first electronic control signal and second electronic control signal when the user presses the button.

9. The vehicle of claim 8, wherein the control generates the second electronic control signal when the user presses the button and wherein the transmission is responsive to the second electronic control signal to transition to a park state.

10. The vehicle of claim 8, wherein the control generates the first electronic control signal when the user presses the button.

11. The vehicle of claim 8, wherein the control generates the first electronic control signal when the user presses the button for a predetermined time period.

12. A vehicle, comprising:

a motor responsive to a first electronic control signal to transition between an active state and an inactive state;

a transmission responsive to a second electronic control signal to transition between at least a reverse state, a neutral state and a drive state;

a passenger compartment having an interior surface;

a user-actuated control mounted to the interior surface, the control having a first contact surface, a second contact surface, and a third contact surface, wherein the first contact surface, the second contact surface, and the third contact surface are integrated with a logo, such that the first contact surface is surrounded by the logo, the second contact surface is surrounded by the logo, and the third contact surface includes a peripheral edge of the logo, and the third contact surface is rotatably movable between at least a first position and a second position; and a circuit coupled to the control to generate at least one of the first electronic control signal and the second electronic control signal in response to user actuation of the control.

13. The vehicle of claim 12, wherein the control generates the second electronic control signal in response to rotational movement of the third contact surface.

14. The vehicle of claim 1, wherein the logo identifies an organization.

15. The vehicle of claim 14, wherein the logo identifies the vehicle as a product of the organization.

16. The vehicle of claim 1, wherein the logo is a design that identifies an organization.

17. The vehicle of claim 1, wherein the logo includes at least one of a symbol or other small design adopted by an organization to identify its products.

18. The vehicle of claim 1, wherein the logo consists of a design that identifies an organization.

19. The vehicle of claim 18, wherein the design identifies the vehicle as a product of the organization.

20. The vehicle of claim 1, wherein the control is molded integrally with the interior surface.

21. The vehicle of claim 1, wherein the interior surface is a dashboard.

22. The vehicle of claim 1, wherein an outer surface of the user-actuated control is substantially flush with respect to the interior surface of the passenger compartment.

* * * * *